United States Patent [19]
Arning et al.

[11] 3,856,323
[45] Dec. 24, 1974

[54] MOTOR VEHICLE CHASSIS SUBASSEMBLY

[75] Inventors: Klaus H. Arning, Birmingham; Robert J. Rumpf, Grosse Pointe, both of Mich.

[73] Assignee: Ford Motor Company, Dearborn, Mich.

[22] Filed: Sept. 1, 1972

[21] Appl. No.: 285,690

Related U.S. Application Data

[62] Division of Ser. No. 52,235, July 6, 1970.

[52] U.S. Cl. ...... 280/96.2 R, 188/206 R, 280/106 R
[51] Int. Cl. .............................................. B60t 13/00
[58] Field of Search .... 280/96.2 R, 106 R, 106.5 R; 188/2 R, 345, 18 A, 206 R, 152; 180/11, 12, 180/79.2 R; 267/11 R

[56] References Cited
UNITED STATES PATENTS

| | | | |
|---|---|---|---|
| 2,369,644 | 2/1945 | Berry et al. ...................... | 280/96.2 R |
| 2,524,012 | 9/1950 | Groebe ........................... | 188/345 X |
| 2,611,625 | 9/1952 | Kishline et al. ................. | 280/96.2 R |
| 2,709,495 | 5/1955 | Vickers ........................... | 180/79.2 R |
| 2,961,253 | 11/1960 | Allison .............................. | 267/11 R |
| 2,997,312 | 8/1961 | Muller et al. .................. | 188/18 A X |
| 3,033,587 | 5/1962 | Perish ........................... | 267/11 R X |
| 3,112,014 | 11/1963 | Jeffries ........................... | 188/18 A X |
| 3,131,963 | 5/1964 | Schilberg ........................ | 280/106 R |

Primary Examiner—Kenneth H. Betts
Attorney, Agent, or Firm—Clifford L. Sadler; Keith L. Zerschling

[57] ABSTRACT

A motor vehicle chassis subassembly including a frame cross member, a front suspension system, a steering linkage, a power steering gear system, and a power brake booster are integrated into a single unit prior to installation of the subassembly into the vehicle. The subassembly construction permits the suspension and steering linkage to be adjusted for obtaining proper wheel alignment and the hydraulic systems of the power brake booster and power steering booster to be charged with hydraulic fluid prior to the assembly of the subassembly into the vehicle body.

5 Claims, 5 Drawing Figures

PATENTED DEC 24 1974

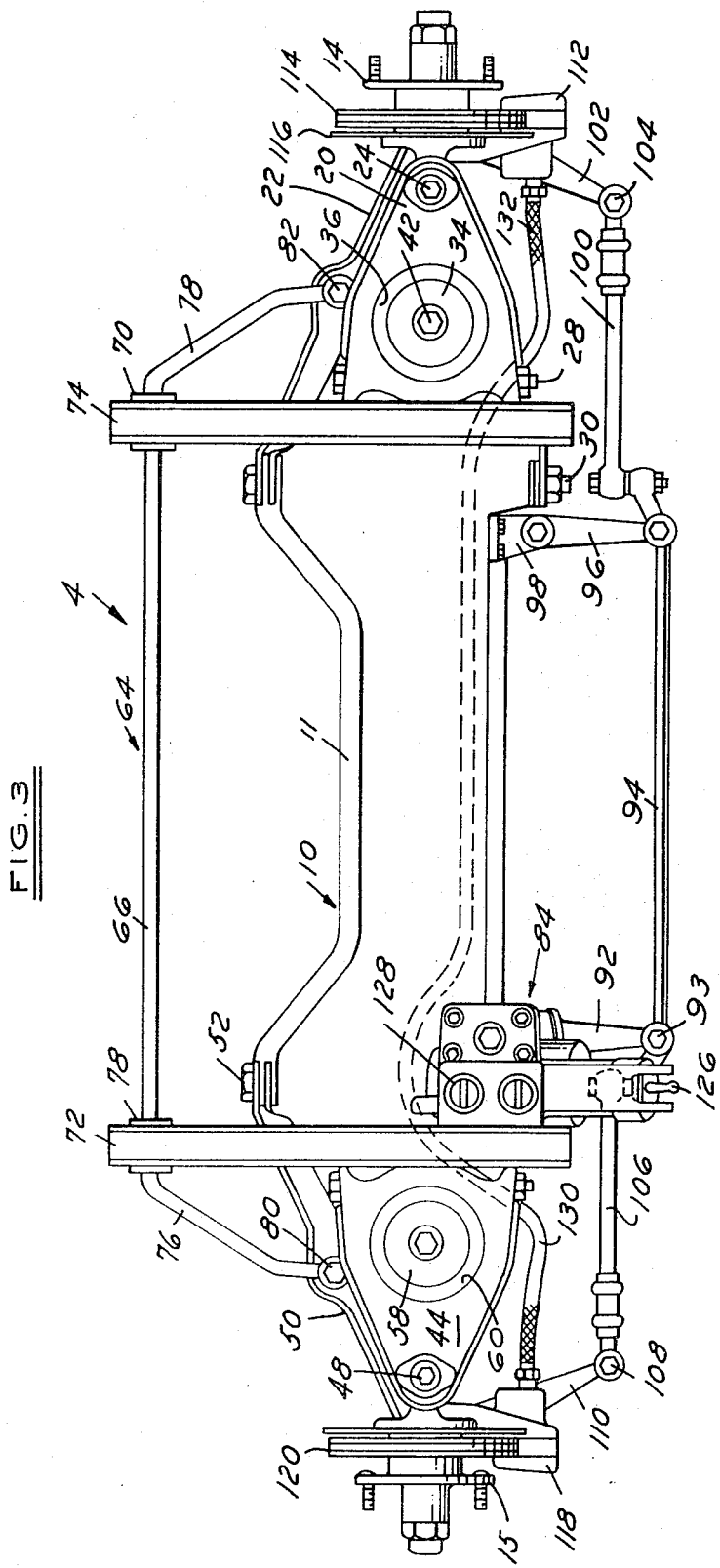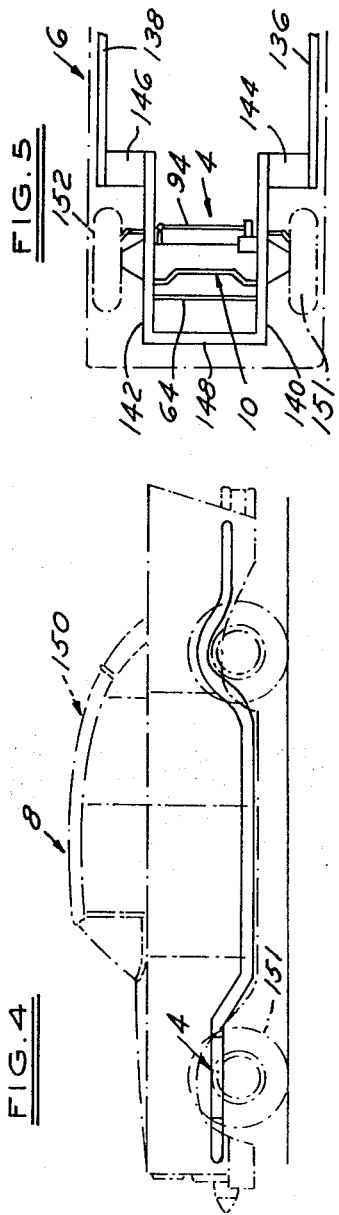

MOTOR VEHICLE CHASSIS SUBASSEMBLY

This is a division of application Ser. No. 52,235, filed July 6, 1970.

BACKGROUND OF THE DISCLOSURE

Prior to the present invention it has been customary practice to manufacture motor vehicles in a piecemeal fashion as the vehicle frame moves down an assembly line. The various chassis components, such as parts of the suspension systems, parts of the steering systems, elements of the driveline, and the power plant are added to the vehicle frame as it progresses from one station to the next along the assembly line. When the chassis is substantially complete, the vehicle body is secured to the frame. The various hydraulic systems, such as the brakes and power steering, are then charged with fluid. Finally, the vehicle is driven off the end of the assembly line and the front suspension and steering are aligned at a separate location.

Various modifications have been suggested for modernizing this manufacturing method of assembling vehicles. It has been suggested, for instance, that various portions of the vehicle frame and body to be preassembled and that these subassemblies be secured in place as the vehicle moves along the assembly line. Many of these subassemblies include large portions of the vehicle frame and are intended for attachment to other portions of the frame. With these suggested modifications, it has remained necessary to charge the hydraulic system of the power brakes and power steering with fluid after the vehicle is substantially complete. It has also been necessary to align the front suspension system and steering after the vehicle has been driven off of the assembly line.

BRIEF SUMMARY OF THE DISCLOSURE

In view of the state of the art, it is the principal object of the present invention to provide an integrated subassembly for a motor vehicle having a front suspension system including upper and lower suspension arms, suspension springs, wheel supporting spindles and stabilizer bar. The integrated subassembly also includes a complete steering system comprising power steering pump, power steering gear and steering linkage. A power brake system is also included in the subassembly and comprises a power brake booster, front disc brake calipers, and hydraulic lines running from the booster to the brake calipers.

The subassembly construction of the present invention permits adjustment of the suspension system, alignment of the steering linkage and fluid charging of the hydraulic steering and brake systems as part of the manufacture of the subassembly prior to its installation into the vehicle body.

A motor vehicle having an integrated chassis subassembly in accordance with this invention may be manufactured at a lower cost because the complexity of assembling the total vehicle is reduced. The subassembly provides the motor vehicle manufacturer with desirable flexibility in his manufacturing technique. The subassembly may be manufactured at the same location where the final vehicle is produced or it may be manufactured at another more convenient site. Economies are also realized because the various suspension, steering and brake components may be more readily secured to the subassembly than to a vehicle on the assembly line. This is due principally to the fact that the various areas of the subassembly are more readily accessible.

In addition, the alignment of the wheels by adjusting the suspension and the steering linkage is more readily accomplished. The subassembly may be placed on an aligning machine for accomplishing this result as distinguished from the present practice of driving the entire finished vehicle to a wheel aligning station after it comes off of the assembly line.

BRIEF DESCRIPTION OF THE DRAWINGS

The many objects and advantages of the present invention will become apparent from the following detailed description and the accompanying drawings, in which:

FIG. 1 is a rear elevational view of an integrated chassis subassembly for a motor vehicle constructed in accordance with the presently preferred embodiment of this invention;

FIG. 2 is a side elevational view of the subassembly of FIG. 1;

FIG. 3 is a top plan view of the subassembly of FIG. 1;

FIG. 4 is a side elevational view of a vehicle showing the body portion in phantom lines and the supporting frame in solid lines; and FIG. 5 is a top plan view of the supporting frame shown in FIG. 4 and of the subassembly shown in FIGS. 1, 2 and 3.

DETAILED DESCRIPTION OF A PREFERRED EMBODIMENT

Figures 1, 2:
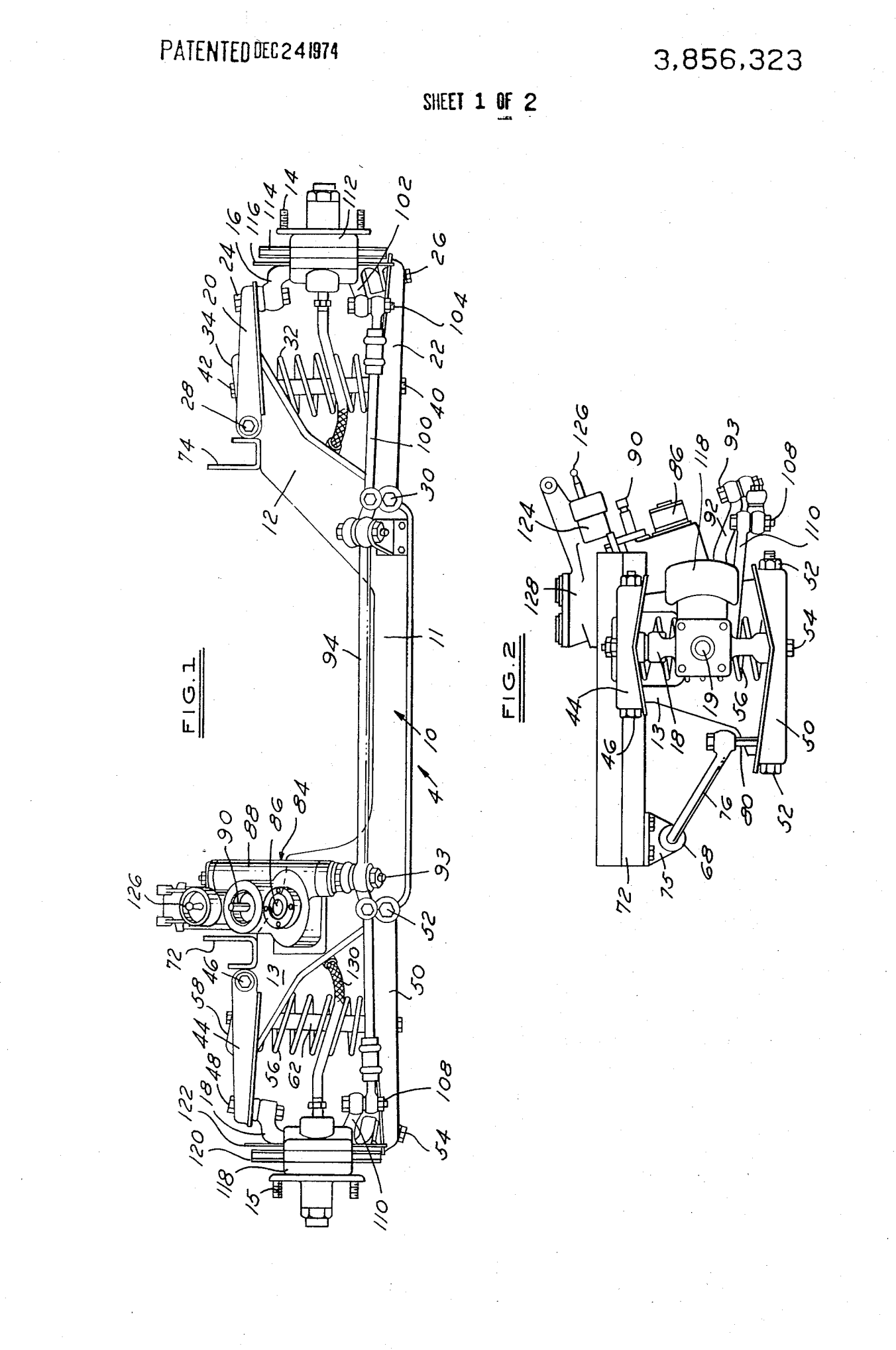

Referring now to the drawings, FIGS. 1, 2 and 3 disclose an integrated chassis subassembly 4 for a motor vehicle constructed in accordance with the presently preferred embodiment of this invention. The subassembly 4 is constructed to be secured to a vehicle frame 6 as shown in FIG. 5 which forms a part of the motor vehicle 8 in FIG. 4.

In FIGS. 1, 2 and 3 a frame cross member 10 constitutes the principal support member of the subassembly 4. The frame cross member 10 has a transversely extending mid-portion 11 and elevated end portions 12 and 13 that extend upwardly and outwardly from the midportion 11.

Wheel support and suspension means are provided as part of the subassembly 4. The wheel support means comprise right and left wheel hubs 14 and 15 that are rotatably supported on steering knuckles or wheel spindles 16 and 18. The wheel spindles 16 and 18 include spindle portions, such as indicated at 19 in FIG. 2 for rotatably supporting the wheel hub 15 (in FIG. 2 the wheel hub 15 is not shown). The spindles 16 and 18 include upper and lower extending portions for connection with the suspension arms of the suspension system as will be described.

Referring now to the right-hand end of the frame 10 for a description of the right front suspension, the wheel spindle 16 is connected to upper and lower wishbone suspension arms 20 and 22 by means of upper and lower ball joints 24 and 26. The inner end of the upper arm 20 is pivotally secured to the elevated end portion 12 of the frame member 10 by means of a pivot shaft 28. The lower suspension arm 22 is pivotally connected to the outer end of the intermediate frame portion 11 by pivot means 30.

A coil spring 32 has its lower end secured to a spring seat situated in the lower suspension arm 22. The upper end of spring 32 is seated in spring seat 34 that is formed in the outer end of frame portion 12. The upper arm 20 has an opening 36 through which the spring seat portion 34 of the frame member 10 protrudes.

A telescopic hydraulic shock absorber 38 has its lower end 40 secured to the lower arm 22 and its upper end 42 secured to the spring seat 34. As is apparent from the drawing, the shock absorber 38 is concentrically disposed within the coil spring 32.

The suspension system securing the left spindle 18 to the left outer end 13 of the frame cross member 10 is generally similar to that described in respect to the construction at the right end of the frame assembly.

An upper suspension arm 44 has its inner end pivotally connected to frame portion 13 by a pivot shaft 46 and its outer end connected to wheel spindle 18 by a ball joint 48. Lower suspension arm 50 has its inner end connected by pivot means 52 to the frame 10 and its outer end connected by ball joint 54 to the lower end of the wheel spindle 18.

A coil spring 56 is interposed between the spring seat on the lower suspension arm 50 and a spring seat 58 formed at the upper outer end of the frame portion 13. Concentrically disposed within the coil spring 56 is a telescopic shock absorber 62 which has its lower end connected to the arm 50 and its upper end connected to spring seat 58. In a manner similar to the construction at the right side of the subassembly, arm 44 has an opening 60 through which the spring seat 58 protrudes.

The suspension system for the integrated chassis subassembly 4 also includes an antiroll stabilizer bar 64. Bar 64 has a generally transversely extending portion 66 that is rotatably supported by rubber bushings 68 and 70 on left and right longitudinal extending frame members 72 and 74. The frame members 72 and 74 have a generally channel shape and are each welded to the frame cross member 10 at a point just inwardly of the pivotal support of the left and right upper suspension arms 44 and 20. The bushings 68 and 70 are supported by brackets, such as bracket 75 which is bolted to the longitudinal frame member 72 as best seen in FIG. 2.

The stabilizer bar 14 has arm portions 76 and 78 that extend generaly longitudinally of the vehicle. Arm 76 has its end connected to the left lower suspension arm 50 by means of a connecting link 80 as shown in FIG. 2. The end of the stabilizer bar arm 78 is connected to the right lower suspension arm 22 by a similar link 82.

In accordance with the present invention, the integrated chassis subassembly 4 includes steering linkage and power steering means. A hydraulic booster unit 84 includes a hydraulic pump 86 that is constructed to be connected to a power source of the vehicle 8 in which the subassembly of FIGS. 1, 2 and 3 is installed. The pump 86 may be driven by an electric motor in which case it would be electrically connected to the vehicle's electrical system. In the alternative, the pump 86 may be mechanically driven by the vehicle's main power plant.

The power steering system includes a power steering gear 88 having an input shaft 90 that is connected in the finished vehicle 8 to the steering wheel by means of a conventional steering column. The steering gear 86 has an output shaft that is connected to a Pitman arm 92. Pivot means 93 connects the Pitman arm 92 to a tie rod 94 near its left end. An idler arm 96 has one end pivotally connected to a frame bracket 98 and its other end pivotally connected to the tie rod 94 near the latter's right end.

A steering link 100 forms an articulated extension of the tie rod 94. Link 100 has its left end connected to the tie rod 94 and its right end connected to a steering arm 102. Arm 102 forms an integral part of the steering spindle 16 and is constructed to support the right wheel of the vehicle. The connection between the steering arm 102 and the link 100 is by means of a steering ball joint 104.

The left end of the tie rod 94 extends beyond its connection with the Pitman arm 92 and is joined to a steering link 106. A steering ball joint 108 connects the left outer end of the link 106 to the steering arm 110 of the left wheel spindle 18.

The power steering gear 88 includes integral valving for directing fluid pressure from the fluid pressure source 86 to one side or the other of a booster piston within the gear 88 when the input shaft is rotated for a left- or right-hand turn. The fluid pressure operating against the booster piston provides a power assist for the motor vehicle operator when he is executing a cornering maneuver.

In accordance with the present invention, front wheel brake and power brake booster means form a part of the chassis subassembly 4. Referring to the right side of the vehicle, a brake caliper 112 is secured to the wheel support spindle 16. The caliper 112 contains brake linings that are constructed to grip a brake rotor 114, the rotor 114 being secured to the wheel hub 12. A nonrotating splash shield 116 is connected to the spindle 16 and protects the rotor 114 from contaminants.

At the left side of the structure 4, the brake caliper 118 is secured to the spindle 18 and is arranged to straddle a brake rotor 120 that is secured to the wheel hub 15. The caliper 118 contains brake lining means constructed to grip the rotor 120 as at the right end of the subassembly. A splash shield 122 is arranged to protect the rotor 120.

The calipers 112 and 118 contain hydraulic motors for actuating the brake linings into engagement with the rotors 114 and 120. The hydraulic motors of the calipers 112 and 118 receive pressure fluid from the booster assembly 84.

The hydraulic unit 84 includes a brake valve 124 that is connected by a pushrod 126 to the vehicle's brake pedal when the assembly of FIGS. 1, 2 and 3 is installed in a vehicle such as disclosed in FIG. 4. The brake booster includes a master cylinder 128. The valve 124 is connected to the fluid pressure source 86 and controls the flow of fluid to a booster piston situated within the brake master cylinder 128 which provides a power assist during brake applications. The master cylinder is connected by hydraulic lines 130 and 132 to the left and right brake calipers 118 and 112, respectively.

The vehicle chassis subassembly 4 of FIGS. 1, 2 and 3 thus includes the suspension system, steering linkage system, the power steering system, the front brake system, and the power brake booster system. The final steps in manufacturing the subassembly of FIGS. 1, 2 and 3 include adjusting the steering linkage and the various suspension elements. The several hydraulic systems incorporated in the subassembly 4 are charged with hydraulic fluid. When completed, including these final steps, the subassembly is secured to the frame 6 of the motor vehicle 8.

Referring to FIG. 4, the main frame assembly 6 includes left and right midside rails 136 and 138 that are joined to left and right forward side rails 140 and 142 by means of torque boxes 144 and 146. A number one frame cross member 148 interconnects the forward ends of the forward side rails 140 and 142. The forward side rails 140 and 142 have straight portions to which the rail members 72 and 74 of the subassembly 4 are secured. As previously explained, rails 72 and 74 are of channel shape with parallel longitudinally extending flanges (see FIG. 1). The frame rails 140 and 142 are constructed to fit within the channels and thus, the subassembly 4 is accurately positioned with respect to frame 6 of vehicle 8.

OPERATION

An integrated chassis subassembly in accordance with this invention provides a unit that facilitates the use of a modular concept in the manufacture of a motor vehicle. The subassembly 4 provides a complete front suspension system and steering linkage system that may be supported by the frame rails 72 and 74 on an appropriate machine for the easy and accurate alignment and adjustment of the components of the two systems. The various links and pivots are exposed and readily accessible for adjustment purposes. The aligning and adjusting operations are performed in order to obtain proper camber, caster and toe-in of the wheel support members. Unlike the presently utilized manufacturing method, these procedures are performed before the subassembly is installed and not after the vehicle has been completely assembled and with the wheels supported on a front end alignment machine as is customary.

The hydraulics of the steering system are complete and form a part of the subassembly 4. The hydraulic components of the power steering system may be precharged with hydraulic fluid after the subassembly 4 has been completed and prior to its installation in the vehicle 8. The hydraulic brake booster system of the vehicle brake system is also complete. Similarly, it may be charged with hydraulic fluid before the subassembly is completed. The brake master cylinder 128, brake lines 130, 132 and the hydraulic motors of calipers 112 and 118 may also be filled with fluid.

It is recognized that the hydraulic lines of the brake system associated with the rear vehicle brakes are distinct from the subassembly of FIG. 1. The rear brake system can also be manufactured as a subassembly having the rear wheel cylinders and brake lines precharged with brake fluid. With a construction of that type, it would be merely necessary to use self-sealing couplings to join the rear brake system to the master cylinder 128 once the subassembly of FIG. 1 is installed in the vehicle.

Thus, the subassembly of FIG. 1 permits the realization of numerous economies in the manufacture of motor vehicles as previously described.

The foregoing description presents the presently preferred embodiment of this invention. Modifications and alterations may occur to those skilled in the art that will come within the scope and spirit of the following claims.

We claim:

1. A motor vehicle chassis subassembly comprising a frame component and front wheel support means,
   suspension means interconnecting said wheel support means and said frame component,
   said suspension means being constructed to resiliently support said wheel support means for jounce and rebound movement relative to said frame component,
   hydraulic brake actuating means secured to said frame component,
   wheel brake means secured to said wheel support means,
   hydraulic conduit means interconnecting said brake actuating means and said wheel brake means,
   mounting means secured to said frame component and constructed to connect said subassembly including said frame component, said wheel support means, said suspension means, said hydraulic brake actuating means and said wheel brake means as a unit to the chassis of a motor vehicle.

2. A motor vehicle chassis subassembly comprising a frame component and front wheel support means,
   suspension means interconnecting said wheel support means and said frame component,
   said suspension means being constructed to resiliently support said wheel support means for jounce and rebound movement relative to said frame component,
   an anti-roll stabilizer bar having a transverse midportion and generally longitudinally extending end portions,
   said midportion being supported on said frame component,
   said end portions being connected to said suspension means,
   hydraulic brake actuating means secured to said frame component,
   wheel brake means secured to said wheel support means,
   hydraulic conduit means interconnecting said brake actuating means and said wheel brake means,
   said frame component including mounting means constructed to connect said subassembly including said frame component, said wheel support means, said suspension means, said stabilizer bar, said hydraulic brake actuating means and said wheel brake means as a unit to the chassis of a motor vehicle.

3. A motor vehicle chassis subassembly comprising a frame component and front wheel support means,
   suspension means interconnecting said wheel support means and said frame component,
   said suspension means being constructed to resiliently support said wheel support means for jounce and rebound movement relative to said frame component,
   manually actuated hydraulic brake actuating means secured to said frame component,
   wheel brake means secured to said wheel support means,
   hydraulic conduit means interconnecting said brake actuating means and said wheel brake means,
   power brake booster means supported on said frame component and connected to said brake actuating means and constructed to provide a power assist to the manual actuation of said brake actuating means, mounting means secured to said frame component and constructed to connect said subassembly including said frame component, said wheel support means, said suspension means, said hydraulic brake actuating means, said power brake booster means and said wheel brake means as a unit to the chassis of a motor vehicle.

4. A motor vehicle chassis subassembly comprising a frame component and front wheel support means, suspension means interconnecting said wheel support means and said frame component, said suspension means being constructed to resiliently support said wheel support means for jounce and rebound movement relative to said frame component, an anti-roll stabilizer bar having a transverse midportion and generally longitudinally extend-end portions, said midportion being supported on said frame component, said end portions being connected to said suspension means, manually controlled hydraulic brake actuating means secured to said frame component, wheel brake means secured to said wheel support means, hydraulic conduit means interconnecting said brake actuating means and said wheel brake means, power brake booster means supported on said frame component and connected to said brake actuating means and constructed to provide a power assist to the manual control of said brake actuating means, said frame component including mounting means constructed to connect said subassembly including said frame component, said wheel support means, said suspension means, said stabilizer bar, said hydraulic brake actuating means, said power brake booster means, and said wheel brake means as a unit to the chassis of a motor vehicle.

5. A motor vehicle chassis subassembly according to claim 4 and including:

said brake means portion of said subassembly being charged with brake fluid prior to the connection of said subassembly to the chassis of a motor vehicle.

* * * * *